UNITED STATES PATENT OFFICE.

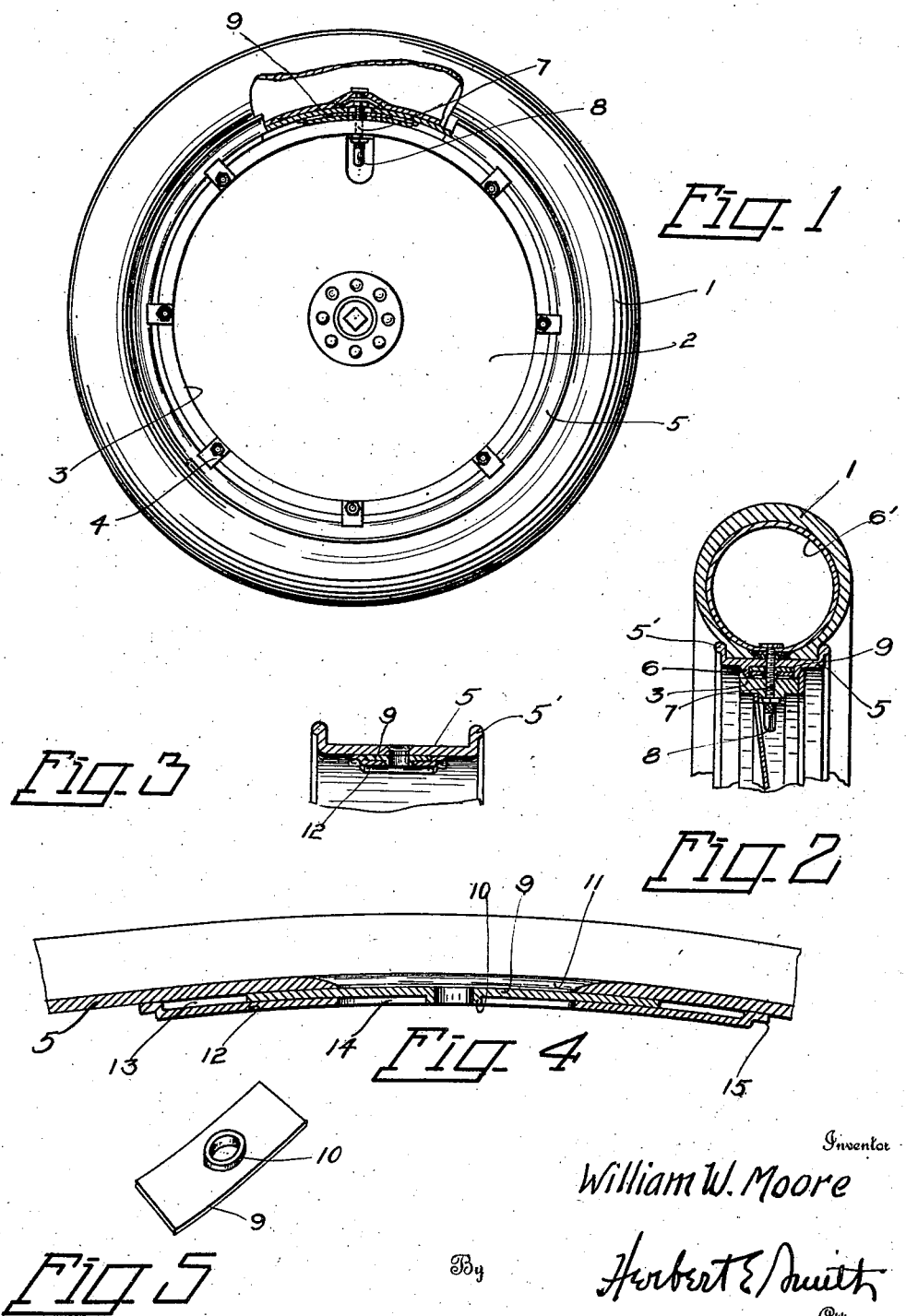

WILLIAM W. MOORE, OF SPOKANE, WASHINGTON.

PNEUMATIC TIRE.

1,415,604.  Specification of Letters Patent.  Patented May 9, 1922.

Application filed April 21, 1921. Serial No. 463,275.

*To all whom it may concern:*

Be it known that I, WILLIAM W. MOORE, a citizen of the United States, residing at Spokane, in Spokane County and State of Washington, have invented certain new and useful Improvements in Pneumatic Tires, of which the following is a specification.

My present invention relates to improvements in pneumatic tires of the automobile type, and is designed particularly for the purpose of improving the construction of the wheel rim for the accommodation of the valve and valve stem of the pneumatic tire portion of the wheel.

As is well known to automobilists and others skilled in mounting the casing of a pneumatic tire, difficulty is often encountered in properly adjusting and alining the valve stem with relation to the rim in order that when pressure is applied to the inner tube the stem will not bind or frictionally engage the sides of the hole in the rim as the latter are now constructed. To facilitate the application of the casing to the wheel, I provide movable and adjustable means, forming an element of the rim, whereby the valve stem is accommodated in the rim and may be applied thereto with ordinary care but with the assurance that after the wheel is assembled and compressed air forced into the inner tube, the stem will be permitted to readily adapt itself to the valve stem opening in the rim, and assume properly alined position through the rim. By the utilization of my invention in a wheel rim all danger of incorrectly positioning the valve stem is avoided and the danger of the stem being torn loose from its tube, or loosened to permit leakage is entirely eliminated.

In the accompanying drawings I have illustrated one complete example of the physical embodiment of my invention in which the parts are combined and arranged according to the best mode I have thus far devised for the practical application of the principles of my invention.

Figure 1 is a view in side elevation of a disk type of pneumatic wheel in which my invention is embodied, part of the wheel being broken away for convenience in illustration of the relationship of parts.

Figure 2 is an enlarged, transverse sectional view of a wheel, at the valve stem location showing the general assembly of parts.

Figure 3 is a still further enlarged transverse sectional view of a channel rim forming part of the wheel and embodying my invention.

Figure 4 is a longitudinal or circumferential sectional view through the channel rim showing the guide plate for the valve stem and the fixed guide plate for this movable guide plate.

Figure 5 is a detail perspective view of the movable guide or adjusting plate for the valve stem.

While I have illustrated a particular type of automobile wheel in the drawings, it will be understood that the invention may be applied to other types or styles of wheels, and the disk wheel of the drawings is used only for purposes of exemplification of the invention. The several parts of the wheel as the tire casing 1, center disk 2 of sheet metal, felly 3 of metal or wood, lugs or fastenings 4, and the channel rim 5 with its annular flanges 6 are all of well known or accepted form, and the inner tube 6 and valve stem 7 with its cap 8 may be of approved or standard type.

In the adaptation of my invention to an existing wheel rim and converting it for use according to my invention, or in the manufacture of especially embodied rims involving the features of my invention, I utilize a movable guiding and adjusting plate 9 for the stem 7, which plate is somewhat curved to conform to the periphery of the rim, and as shown in Figure 5 may be rectangular in outline, although other shapes may be adopted if desired.

At its center, the curved plate 9 is fashioned with an opening and at its inner side, when in proper position, the plate has an open boss 10 projecting therefrom in order that its walls may be of suitable depth to encase the stem after the latter has been inserted therein, the opening through the boss being of circular formation and of sufficient diameter to permit ready reception of the valve stem 7.

As best seen in Figure 4 the plate is combined for use with the rim channel 5, which latter is provided with a central, circumferentially extending slot 11 of sufficient length to permit circumferential movement of the stem and guide plate, but of proper width to prevent lateral movement of the stem or plate with relation to the rim. The movable guide plate is encased by a fixed guide plate 12 of proper thickness of metal, offset from the inner face of the rim a sufficient distance to form a pocket 13 of a length necessary to provide end spaces approximately equal to the length of the slot 11 in the rim. The movable guide plate is encased in this pocket and the boss of the plate projects through a slot in the fixed plate indicated at 14, which is approximately the length of the slot 11 in the rim, and of a width to permit free movement of the boss therein. The walls of the pocket 13 are flanged as at 15 and may be brazed, welded, or riveted to the inner face of the wheel rim as shown in Figure 4, to form a rigid structure therewith.

The utility of the invention will be apparent from the description and illustration herein given, and it will be evident that in assembling the parts of the wheel, when the casing is mounted on the rim, if the casing is started on the rim so that the valve stem 7 will pass through the open boss 10 of the plate 9 the air may be introduced through the valve stem to the inner tube in usual manner. If the stem is not in alined, radial position preliminary to the introduction of air pressure, it will readily be seen that the increasing pressure in the tire will cause the stem to assume the correct position and the movable guide plate 9 is readily adjusted to the movement of the stem in erecting itself, thus permitting the stem to assume the proper radial position with respect to the wheel. As the stem assumes the correct position the slide plate 9 moves in its pocket either to the right or to the left in Figure 4 until the stem is in alined position.

The pocket may be applied to the wheel rim with facility and at comparatively slight expense, and the slide or guide plate may be stamped or struck up from metal in quantities of production thus insuring an inexpensive but comparatively perfect device for performing its required functions.

Having thus fully described my invention, what I claim as new and desire to secure by Letters Patent is:—

1. The combination with a circumferentially slotted wheel, rim and a slotted, fixed plate thereon forming a pocket on its inner periphery, of a movable guide plate in said pocket and said slotted rim and movable plate adapted to receive a valve stem as described.

2. The combination with a circumferentially slotted wheel rim and a complementarily slotted fixed plate on the inner periphery of the rim forming a pocket, of a movable guide plate in said pocket having an inner open boss movable in the slotted fixed plate, and said rim and slide plate adapted to receive a valve stem as described.

3. The combination with a pneumatic tire including its outer casing, inner tube and valve stem thereon and a circumferentially slotted wheel rim, of a circumferentially movable guide plate to receive said stem, and means on said rim for retaining said guide plate.

In testimony whereof I affix my signature.

WM. W. MOORE.